United States Patent Office 3,535,329
Patented Oct. 20, 1970

3,535,329
CERTAIN 2-[4-(DILOWER ALKYLAMINOLOWER-ALKOXY)PHENYL]-4,6-DIPHENYL PYRIDINES AND DERIVATIVES THEREOF
Rudolf G. Griot, Riehen, Basel-Stadt, Switzerland, assignor to Sandoz-Wander, Inc., Hanover, N.J.
No Drawing. Filed Mar. 7, 1969, Ser. No. 805,346
Int. Cl. C07d 31/48
U.S. Cl. 260—296
4 Claims

ABSTRACT OF THE DISCLOSURE

This invention relates to 4,6-dicyclosubstituted-2-[p-(ω-aminoalkoxy)phenyl]pyridines useful as hypolipidemics, and to preparation of such compounds involving intermediates which are 4'-(ω-aminoalkoxy)chalcones.

---

The present invention relates to 4,6-cyclosubstituted-2-[p-(ω-aminoalkoxy)phenyl]pyridines and methods of preparing the same. The invention also relates to intermediates useful in preparation of such compounds and to processes for preparing said intermediates.

The substituted pyridines of the present invention are those represented by the following structural formula:

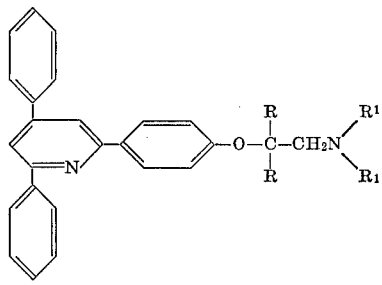

(I)

wherein
each of R is, independently, hydrogen or lower alkyl of not more than 4 carbon atoms; and
each of $R_1$ is, independently, lower alkyl or both $R_1$ together an alkylene bridge of 4 or 5 carbon atoms, i.e., both $R_1$ together with the amino nitrogen form an N-pyrrolidyl or N-piperidyl substituent; or a pharmaceutically acceptable acid addition salt thereof.

A preferred method for preparing the compounds of the invention involves reaction of a 4'-(ω-aminoalkoxy)chalcones, e.g., 4'-(2-diethyl-aminoethoxy)chalcone, with ammonium acetate and a quaternary phenylacyl pyridinium or quinolinium halide such as phenacylpyridinium bromide in the presence of a suitable solvent, preferably acetic acid. Such preparation is illustrated below:

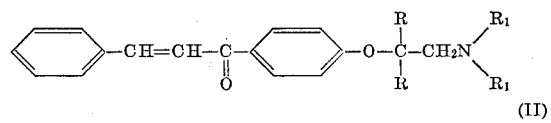

(II)

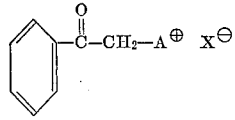

(III)

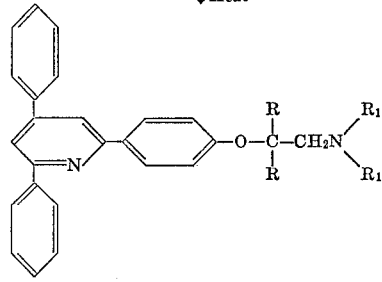

(I)

wherein R and $R_1$ are as defined above, X is halogen having an atomic weight of from 19 to 127, and A is pyridyl or quinolyl.

The production of the invention compounds of Formula I by Step A involving reaction of a compound of Formula II with a quaternary salt of Formula III and ammonium acetate is conveniently carried out at elevated temperatures in the presence of a suitable solvent. Preferably, the reaction is effected at reflux temperatures ranging usually between about 70° C. to 110° C. The especially preferred solvent for the reaction is acetic acid. Depending upon the particular conditions employed the reaction time may vary usually from about 30 minutes to 5 hours, more usually 1 to 3 hours. Compounds I are conveniently recovered in the form of an acid addition salt, preferably the hydrochloride, and, if desired, may be converted to the free base by conventional procedures. The reaction of Step A is analogous to those already described in the literature, for example, in Chem. Berichte 94, 691.

Intermediate compounds (II) reacted in Step A are preferably prepared by reaction of benzaldehyde with the desired 4-(ω-aminoalkoxy) phenyl-acetophenone, as illustrated below:

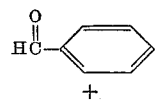

(IV)

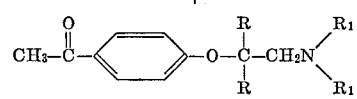

(V)

Step B ↓

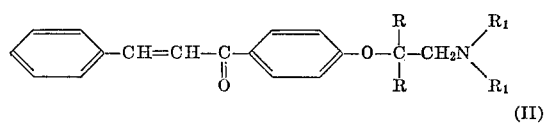

(II)

wherein R and $R_1$ are as defined above.

The production of intermediate compounds II by Step B involving reaction of benzaldehyde with the p-substituted acetophenone compound V is conveniently carried out analogously to well-known procedures for preparation of chalcones, for example, as exemplified below in Step A of Example 1.

The compounds V employed in Step B for preparation of compound II are either known or can be readily prepared from available materials by established procedures, for example, as exemplified below in Example 1.

Intermediates compounds III are preferably prepared as illustrated below:

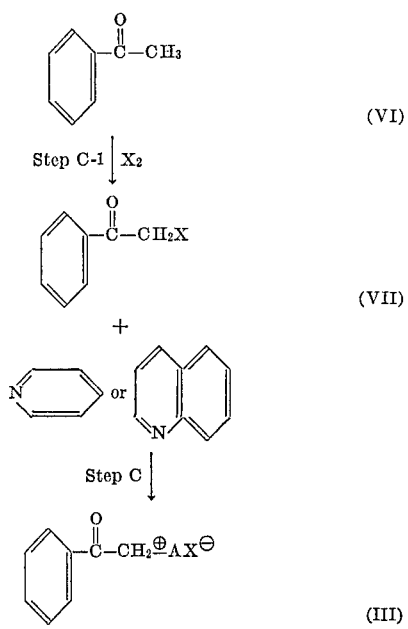

wherein X and A have the meaning above defined.

Step C-1 involves a conventional halogenation, preferably employing bromine to convert compound VI to its mono-halo derivative compound VII.

In Step C the compound VII is readily reacted with pyridine or quinoline, preferably pyridine, according to conventional procedures to obtain compound III which is readily recovered in the form of the quaternary halide. A satisfactory literature reference for the reactions of both Steps C-1 and C is Chem. Berichte 94, 691.

Also within the scope of the present invention are pharmaceutically acceptable salts not materially affecting the pharmacological effect of the compounds of Formula I. Such salts include the acid addition salts, e.g., the hydrochloride, fumarate, formate, acetate, citrate, sulfonate, malonate, tartrate, methane sulfonate, salicylate and hydrosulfate. Certain acid addition salts as produced by the invention may contain alcohol of crystallization such as the lower alkanols preferably employed in certain cases. Such alkanols are also within the scope of the invention as being generally pharmaceutically acceptable. The acid addition salts may be produced as desired from the corresponding free bases by conventional procedures. Conversely, the free bases may be obtained from the salts and alkanoates by procedures known in the art.

The compounds of structural Formula I and their pharmaceutically acceptable acid addition salts are useful because they possess pharmacological activity in animals. More specifically, the compounds are useful as hypolipidemic agents, as indicated by tests in which white rats are given 5–50 milligrams per kilogram of body weight per diem of the compound orally, for 6 days, followed by extraction with isopropanol of serum or plasma from the sodium hexobarbital anesthetized rat, and noting the cholesterol and triglyceride contents as compared to those of a control group. The cholesterol and triglyceride contents are determined by the methods described by Lofland, H. B., Aanal. Biochem. 9:393 (1964): (Technicon method N 24a): and Kessler, G., and Lederer, H. Technicon Symposium Mediad Inc., New York, pages 345–347 (1965), respectively. In particular, the compounds of the invention when evaluated in the above test exhibit an ability to reduce triglycerides markedly while cholesterol levels are essentially unchanged or only slightly modified, and thus the compounds are indicated as hypotriglyceridemic agents of relatively high selectively. For such useage, the compounds may be administered orally as such or admixed with conventional pharmaceutical carriers. The dosage administered may vary depending on known factors such as the particular compound employed and the severity of the condition being treated. In general, satisfactory results are obtained when administered at a daily dosage of from about 4 milligrams to about 30 milligrams per kilogram of animal body weight, preferably given in divided doses, 2 to 4 times a day, or in sustained release form. For most mammals the total daily dosage is from about 0.05 gram to about .4 gram of the compound, and the dosage forms suitable for internal use comprise from about 12.5 milligrams to about 200 milligrams of active compound in intimate admixture with a solid or liquid pharmaceutically acceptable carrier or diluent.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents or preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredient: | Weight (mg.) |
| --- | --- |
| 2-[4-(2-diethylaminoethoxy)phenyl] - 4,6 - diphenylpyridine hydrochloride | 50 |
| Tragacanth | 10 |
| Lactose | 197.5 |
| Corn starch | 25 |
| Talcum | 15 |
| Magnesium stearate | 2.5 |

The following example more particularly illustrated the invention and the manner in which the compounds thereof are prepared. However, it is to be understood that this exemplification is for purposes of illustration only and is not intended as in any way limiting the scope of the invention.

EXAMPLE 1

2-[4-(2-diethylaminoethoxy)phenyl]-4,6-diphenylpyridine hydrochloride

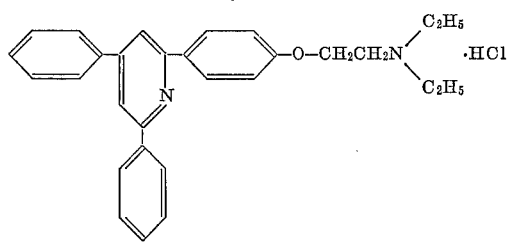

Step A.—Preparation of 4'-(2-diethylaminoethoxy) chalcone hydrochloride

A solution of 47 g. of p-[2-(diethylamino)ethoxy]acetophenone, a known compound prepared according to British Pat. 377,464, and 20 g. of benzaldehyde dissolved in 100 ml. of ethanol is prepared and there is added thereto 80 ml. 2 N sodium hydroxide with intensive stirring at room temperature. The resulting mixture is stirred for 24 hours at room temperature and evaporated in vacuo to remove solvent. The residue is taken up in 200 ml. water and the resulting basic mixture is treated by extraction with ethyl acetate, the organic phase evaporated in vacuo to dryness, and the residue recrystallized twice from ethanol to give 4'-(2-diethyl-aminoethoxy)chalcone hydrochloride, M.P. 167–168.5° C.

Step B.—Preparation of 2-[4-(2-diethylaminoethoxy) phenyl]-4,6-diphenylpyridine hydrochloride A mixture of 35.9 g. of 4'(2-diethylaminoethoxy)chalcone, 27.8 g. of 1-phenacyl-pyridinium bromine and 100 g. ammonium acetate in 133 ml. glacial acetic acid is refluxed for three hours. The resulting solution is concentrated under reduced pressure, the residue taken up in 1000 ml. water, and made alkaline by addition of 50% sodium hydroxide solution. The resulting mixture is extracted three times each with 300 ml. of ether and the extracts combined, washed with saturated sodium chloride solution and dried over magnesium sulfate. The resulting ethereal solution is filtered and the filtrate treated with an excess of hydrogen chloride saturated ether to give an amorphous hydrochloride which was triturated with ether.

The salt is then dissolved in a minimum of boiling isopropanol, treated with charcoal and a white, crystalline material is obtained. Two additional recrystallizations from ethanol are followed by three recrystallizations from isopropanol and drying under reduced pressure seven days at 60° C. to obtain 2-[4-(2-diethylaminoethoxy)phenyl]-4,6-diphenylpyridine hydrochloride, M.P. 187–189° C.

What is claimed is:
1. A compound of the formula:

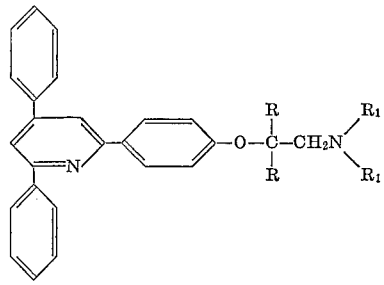

wherein each of R is, independently, hydrogen or lower alkyl; and
each of $R_1$ is, independently, lower alkyl or both $R_1$ together form an alkylene bridge of 4 or 5 carbon atoms; or a pharmaceutically acceptable acid addition salt thereof.

2. A compound of claim 1 in which both R are hydrogen and $R_1$ is lower alkyl of 1 or 2 carbon atoms.

3. A compound of claim 1 in which both R are lower alkyl of 1 or 2 carbon atoms and $R_1$ is lower alkyl of 1 or 2 carbon atoms.

4. A compound of claim 2 which is 2-[4-(2-diethylaminoethoxy)phenyl]-4,6-diphenylpyridine.

References Cited

UNITED STATES PATENTS 3,396,169   8/1968   Lednicer _____ 260—294.7

ALAN L. ROTMAN, Primary Examiner

U.S. Cl. X.R.

260—240, 294.7, 294, 293.4, 294.8, 295; 424—263, 266, 267